July 23, 1963 R. HUBER 3,098,771
PRIMARY BATTERY CELL FOR HIGH CURRENT LOADS
AND METHOD OF ITS MANUFACTURE
Filed Sept. 30, 1959

INVENTOR.
RICHARD HUBER
BY
M. H. Radde
AGENT

United States Patent Office 3,098,771
Patented July 23, 1963

3,098,771
PRIMARY BATTERY CELL FOR HIGH CURRENT LOADS AND METHOD OF ITS MANUFACTURE
Richard Huber, Ellwangen an der Jagst, Germany, assignor to Pertrix-Union G.m.b.H., Ellwangen an der Jagst, Germany, a company of Germany
Filed Sept. 30, 1959, Ser. No. 843,450
Claims priority, application Germany Oct. 3, 1958
10 Claims. (Cl. 136—103)

The present invention relates to primary battery cells for high loads and to a method for their manufacture.

Leclanché-type primary battery cells comprise a solution electrode, preferably of zinc, a depolarizer, preferably of manganese dioxide, and a neutral or acid electrolyte. Commercially available cells of this type show a strong polarization, i.e., they characteristically have only a small ampere-hour capacity at a high load. This capacity increases with a decrease in the load and tends to reach its maximum value only at very small discharge currents. The maximum capacity value of the cell is determined by the gram equivalents of manganese dioxide in the bobbin. Therefore, conventional primary battery cells are effective only for loads of about 300 milliamperes or less.

As another result of the strong polarization, such cells have a relatively steeply descending discharge curve.

Since there has been a need for a Leclanché cell which may be discharged at current loads of one ampere to two amperes, i.e., which is effective at considerably higher loads than could heretofore be achieved, the attempt has been made to meet this requirement with a natural manganese dioxide-alkaline electrolyte-zinc cell. Such cells may, indeed, be operated at relatively high loads, i.e., at about one ampere for several hours. However, the structure of such cells differs fundamentally from that of conventional cells and, therefore, necessitates new manufacturing apparatus and methods. Its complicated structure is caused by the strong zinc polarization in an alkaline electrolyte and the corresponding necessity of giving the solution electrode a very large surface. For this purpose, zinc tinsel or porous zinc anodes compressed from zinc dust have been used. Instead of the conventional positive bobbins, the depolarizer has been pressed against the walls of a steel cup in these cells and the electrolyte has been arranged in the interior of the cylinder. This makes it necessary to reverse the poles of the cell so that the alkaline cells of this type must be placed upside down to produce cells of the usual pole arrangements.

It is clear, therefore, that the additional load is obtained at the price of more complicated manufacturing methods and devices for such cells. Furthermore, the use of the zinc-alkali hydroxide combination always entails the danger of excessive hydrogen formation and such cells, therefore, sometimes explode after extended storage or sudden discharge. Also, because of the corrosive nature of the electrolyte and the necessity of protecting it from absorbing carbon dioxide from the air, particular care is required in hermetically sealing these cells.

It is the primary object of the present invention to produce a Leclanché cell for high current loads, which is free of the disadvantages of the cells with alkaline electrolytes.

This and other objects are accomplished in accordance with the invention by providing a depolarizing mix containing more than 15%, preferably 20% to 25%, by weight of the depolarizer, of carbon black and more than 60%, preferably from 70% to 80%, by weight of the dry mix, of an inner electrolyte having a strong buffering effect on hydroxyl ions and a pH not exceeding 7.0, the depolarizer being so finely comminuted that at least 70% thereof, preferably 80%, pass through a sieve having 10,000 mesh sq. cm.

According to present practice, no more than about 20 parts to 25 parts of electrolyte per 100 parts of dry mix are admixed to the depolarizer because a higher percentage of inner electrolyte makes the consistency of the mass so loose that molding of the bobbin becomes impossible. It has now unexpectedly been found that a moldable mass is obtained with an addition of more than 60% by weight of electrolyte if the percentage of the carbon addition is increased far above its conventional limit to about 20% to 25 parts, based on the dry depolarizer mass weight, and the depolarizer mass is so finely comminuted that at least about 70% thereof passes through DIN-sieve 100 (10,000 mesh sq. cm.).

Preferably, the electrolyte in the depolarizer mix consists of a zinc chloride solution containing more than 40%, by weight, preferably between about 50% and 60%, of zinc chloride. Such an inner electrolyte has a particularly strong hydroxyl ion buffering action so that the hydroxyl ions formed at the depolarizer, which interfere with the discharge operation, are rapidly made ineffective.

In accordance with another preferred embodiment, highly hygroscopic carbon black types are used for the depolarizer, for instance, a carbon black capable of absorbing 25 cc. to 30 cc. of an acetone-water mixture (10:90) per 5 g. of carbon black.

According to yet another preferred embodiment, the positive electrode of the cell is a wound type of electrode. This makes it possible to increase the surface of the electrode considerably and thus to produce a notable increase in the load at which the cell may be operated. The use of conventional carbon plate current collectors is out of the question because they are not sufficiently strong mechanically when they are thin and take up too much room when they are sufficiently thick.

Also, it is not possible to use conductive films of known types for this purpose because the internal resistance of such films is to great for the desired loads. Therefore, the carrier material must be a metal film, a metal net, or a thin sheet metal member which is resistant to chemical attack by the neutral or acid electrolyte solutions used in the depolarizer. Tantalum or tantalum-coated metal or tantalum alloys have proved to be of particular advantage for this purpose because tantalum does not only have the required chemical resistance but also causes very little resistance between the positive electrode and the current collector. Tantalum sheet metal is attacked neither by chlorine ions in the electrolyte nor by manganese dioxide in the depolarizer. Cells with such positive electrodes have been stored for months without any decrease in their electromotive force.

The manganese dioxide may be molded onto the tantalum electrode or it may be brushed onto it. It is also possible to produce the current collector by sintering tantalum powder.

The current collector of the positive electrode in the cell of the present invention may also be made of titanium. As is known, this metal may also be used for this purpose in the form of a sheet metal member, a net, a film, or a sintered body. Titanium coated metals and titanium alloys are also useful for this purpose.

It is one of the advantages of the invention that the current collector and conductor of the positive electrode may take the form of a plate, with or without perforations or recesses, which has the depolarizer mix molded thereon. Alternatively, the current collector and conductor of the positive electrode may be a net into which the depolarizer mass is molded or brushed or a film to which the depolarizer mass is applied, preferably electrolytically.

A depolarizer electrode according to the invention, which may be readily molded into a bobbin in conventional bobbin molds, is produced by mixing 80 parts of manganese dioxide, 18 parts of acetylene black, and 72 parts of an inner electrolyte solution. The electrolyte solution consisted, for instance, of 70 parts of water, 16 parts of sal ammoniac, and 14 parts of zinc chloride. A preferred solution consisted of 45 parts of water and 55 parts of zinc chloride.

The gelatinous paste between the anode and the cathode of the cell may be the usual mixture of flour and/or starch with an ammonium chloride-zinc chloride solution or a concentrated zinc chloride solution, with carob-bean flour as a gelatinizing agent. Also, dry cells of the paper-lined construction may have a bobbin according to the present invention, which is wrapped in a special grade of paper that has been treated with an electrolyte paste composition on one or both sides. The wrapped bobbins are placed in zinc cans. Such separators and electrolyte carriers are well known per se and form no part of this invention, except as far as they are combined with the other features of the primary battery cell herein described.

One embodiment of a cell constructed according to the present invention is illustrated in the accompanying drawing wherein FIG. 1 is a vertical cross section of the dry cell;

Figure 1:
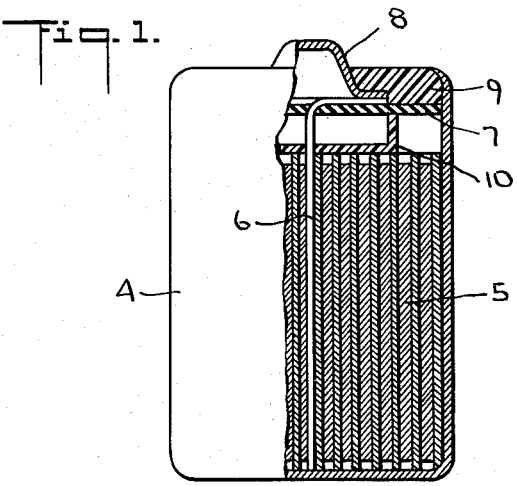
Figure 2:
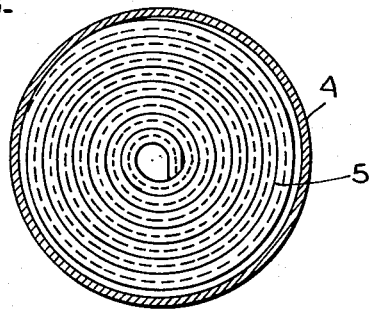
FIG. 2 is a horizontal cross section of the wound electrode.

Referring now to the drawing, there is shown a cell encased in zinc can 4 holding a wound or rolled-up cathode and depolarizer 5. The positive electrode is constituted by a metal wire 6 connected to positive current collector and conductor cap 8. Spacer 10 is arranged on the wound member 5 and carries the cardboard collar 7. The cell is sealed with bitumen mass 9.

Figure 3:
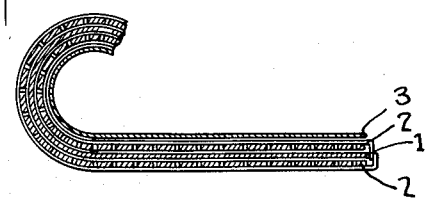
FIG. 3 illustrates the method of making the wound electrode.

As shown in FIG. 3, the wound electrode consists of a strip 1 of tantalum or titanium. Manganese dioxide is pressed on both sides of metal strip 1 and separator leaves 2 are mounted over the manganese dioxide layers to cover the same. The separators may be of paper, fabric, or any absorptive web which is impregnated with an electrolyte solution or carries an electrolyte paste. Zinc strip 3 is placed on this laminate to serve as the negative electrode and the whole structure is rolled up in the manner indicated in FIG. 3. Thus, the zinc strip lies at both sides of the positive electrode 1. The zinc strip is so dimensioned that it envelops the entire wound-up member. In this manner, it establishes contact with zinc can 4 which thus serves as a current conductor for the negative electrode.

In a cell constructed according to the illustrated embodiment, the load per square centimeter of the electrode is decreased by about 350% compared to the classical Leclanché cell and the capacity of the cell is accordingly increased by about 200%.

Primary battery cells constructed according to the present invention show very little polarization and can deliver current of one ampere for 5½ hours until their voltage has decreased to half its nominal value. Furthermore, in contrast to the steep discharge curves of conventional cells, the discharge curve of the novel cells according to the present invention is flat, as is characteristic for mercuric oxide cells, air-depolarized cells, and storage batteries. This advantageous property of the voltage curve during discharge makes cells particularly useful as a current source for transistor radios for ultra short waves. In view of the high load they can sustain, such battery cells may also advantageously be used as current sources for electric appliances, such as mixers, tape recorders, small vacuum cleaners, electric razors, phonographs, large electrically controlled toys, etc.

It is a particular advantage of these cells that they may be produced with conventional manufacturing facilities and that their high efficiency is obtained without the use of strongly corrosive electrolytes, like concentrated alkaline solutions, which are difficult to handle.

While the present invention is not tied to any theory, it is assumed that the high efficiency of the cells, which is obtained despite the fact that only about a third of the amount of manganese dioxide conventional for Leclanché cells is used, is due to the elimination of polarizing ion diffusion.

It may be mentioned that, for instance, suitable titanium and tantalum alloys are alloys with manganese, iron, chromium, magnesium, nickel, copper, cobalt, aluminum, molybdenum and tungsten. Especially suitable are alloys of titanium and tantalum with manganse, magnesium, aluminum, and chromium. It is, of course, also possible to use ternary or quaternary alloys of titanium or tantalum with said metals. Titanium carbide may also be used as current collector and conductor.

Preferably carbon black made by exothermic decomposition under pressure of substantially pure acetylene in a refractory chamber is used as admixture to the depolarizing mix. Its absorptivity must be such that it does not decrease to less than 50% of its initial absorptivity when grinding, for instance, a sample of 30 g. of said acetylene black with 250 g. of porcelain balls for 20 minutes in a ball mill.

Another suitable depolarizer mix is composed of 70 parts of manganese dioxide, 16 parts of acetylene black, 1 part of zinc oxide, and 70 parts of a zinc chloride solution of the density 1.30. Said paste is spread into a wire net of tantalum or it is applied to a tantalum foil. The resulting positive or depolarizer electrode is wrapped on both sides into kraft paper. This kraft paper is preferably provided on the side opposite to the depolarizing mix with an electrolyte-gelling agent layer. Otherwise the procedure is as described hereinabove with respect to the drawings. The tantalum or titanium strip 1 (FIG. 3) is connected with the positive current collector and conductor cap 8 by means of the tantalum or titanium wire or rod 6 (FIG. 1) which is welded to said tantalum or titanium wire net or foil 1.

I claim:

1. In a primary battery cell for high loads and comprising a zinc solution electrode: a depolarizing mix containing manganese dioxide as a depolarizer and between 20% and 25%, by weight of the depolarizer, of carbon black, the mix being so finely comminuted that at least about 80% thereof passes through a sieve having 10,000 mesh/sq. cm. and containing between 70% and 80%, based on the weight of the dry mix, of an electrolyte consisting of a zinc chloride solution containing between 50% and 60%, by weight, of zinc chloride.

2. The cell of claim 1, wherein the carbon black has an absorptivity of 25 cc. to 30 cc. of an acetone-water mixture (10:90) per 5 g. of carbon black.

3. The cell of claim 1, further comprising a positive electrode with a current collector and conductor of a metal selected from the group consisting of titanium and titanium alloys.

4. The cell of claim 1, further comprising a positive electrode with a current collector and conductor of a titanium-plated metal.

5. The cell of claim 1, further comprising a positive electrode with a current collector and conductor of a metal selected from the group consisting of tantalum and tantalum alloys.

6. The cell of claim 1, further comprising a positive electrode with a current collector and conductor of a tantalum-plated metal.

7. The cell of claim 1, further comprising a positive electrode with a current collector and conductor metal strip carrying the depolarizing mix.

8. The cell of claim 7, wherein the current collector and conductor metal strip carries the electrolytically applied depolarizing mix.

9. The cell of claim 1, further comprising a positive electrode with a current collector and conductor composed of a wire net of a metal selected from the group consisting of tantalum, titanium, and their alloys, said wire net having molded thereinto the depolarizing mix.

10. The cell of claim 1, further comprising a positive electrode with a current collector and conductor composed of a wire net of a metal selected from the group consisting of tantalum, titanium, and their alloys, said wire net having brushed thereinto the depolarizing mix.

References Cited in the file of this patent

UNITED STATES PATENTS

| | | |
|---|---|---|
| 525,235 | Solomon | Aug. 28, 1894 |
| 2,262,734 | Hileman | Nov. 11, 1941 |
| 2,631,116 | Fox | Mar. 10, 1953 |
| 2,636,856 | Suggs et al. | Apr. 28, 1953 |
| 2,661,388 | Warner et al. | Dec. 1, 1953 |
| 2,748,183 | Morehouse et al. | May 29, 1956 |
| 2,766,315 | Jobe et al. | Oct. 9, 1956 |
| 2,771,381 | Morehouse | Nov. 20, 1956 |
| 2,783,292 | Ruben | Feb. 26, 1957 |
| 2,831,046 | Linton | Apr. 15, 1958 |
| 2,903,498 | Sindel et al. | Sept. 8, 1959 |

FOREIGN PATENTS

| | | |
|---|---|---|
| 18,754 | Great Britain | Sept. 16, 1899 |